(12) United States Patent
Konishi

(10) Patent No.: US 10,958,797 B2
(45) Date of Patent: Mar. 23, 2021

(54) IMAGE FORMING APPARATUS FOR FORMING IMAGE ON RECORDING PAPER

(71) Applicant: KYOCERA Document Solutions Inc., Osaka (JP)

(72) Inventor: Kohei Konishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/730,088

(22) Filed: Dec. 30, 2019

(65) Prior Publication Data

US 2020/0218478 A1   Jul. 9, 2020

(30) Foreign Application Priority Data

Jan. 9, 2019   (JP) .............................. JP2019-002010

(51) Int. Cl.
*H04N 1/00* (2006.01)
*G06F 3/12* (2006.01)

(52) U.S. Cl.
CPC ....... *H04N 1/00424* (2013.01); *G06F 3/1208* (2013.01); *G06F 3/1257* (2013.01); *H04N 1/00408* (2013.01); *H04N 1/00413* (2013.01)

(58) Field of Classification Search
None
See application file for complete search history.

(56) References Cited

U.S. PATENT DOCUMENTS

| | | | | |
|---|---|---|---|---|
| 5,079,723 A | * | 1/1992 | Herceg ................ | G03G 15/502 345/173 |
| 2001/0026699 A1 | * | 10/2001 | Ishikura ............. | H04N 1/00482 399/81 |
| 2007/0109580 A1 | * | 5/2007 | Yoshida .................. | G06F 9/451 358/1.13 |
| 2007/0143671 A1 | * | 6/2007 | Paterson ............... | G06F 3/1208 715/209 |
| 2010/0017731 A1 | * | 1/2010 | Taira ....................... | G06F 3/038 715/765 |
| 2011/0161881 A1 | * | 6/2011 | Tomita ............... | H04N 1/00474 715/825 |
| 2014/0022598 A1 | * | 1/2014 | Neeleman ............. | G06F 3/1257 358/1.15 |
| 2018/0275931 A1 | * | 9/2018 | Saigusa ................. | G06F 3/1205 |

FOREIGN PATENT DOCUMENTS

JP   2010-010843 A   1/2010

* cited by examiner

*Primary Examiner* — Miya J Williams
(74) *Attorney, Agent, or Firm* — IP Business Solutions, LLC

(57) ABSTRACT

An image forming device includes: a display device; a storage device that stores finish icons indicating respective finished states of a plurality of types of printed material, function icons indicating respective functions of setting finished states of the printed materials, and a correspondence relationship between the finish icon and the function icon indicating the function of setting the finished state of the printed material indicated by the finish icon; and a control device that includes a processor and, by the processor executing a control program, functions as a controller. The controller reads out the finish icon from the storage device, causes the display device to display, on a screen thereof, the finish icon, reads out the function icon associated with the finish icon from the storage device based on the correspondence relationship, and causes the display device to display the function icon in association with the finish icon.

8 Claims, 16 Drawing Sheets

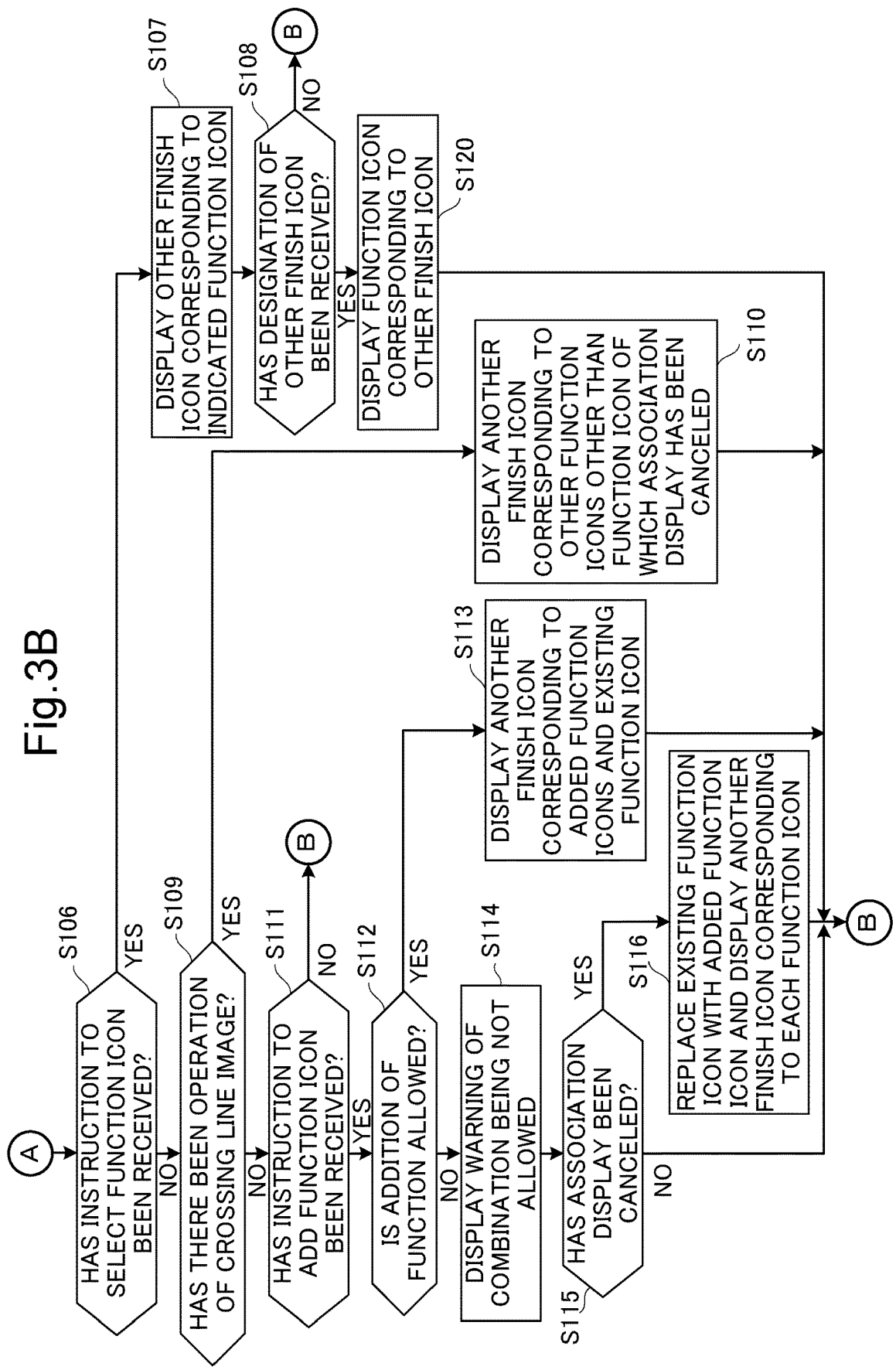

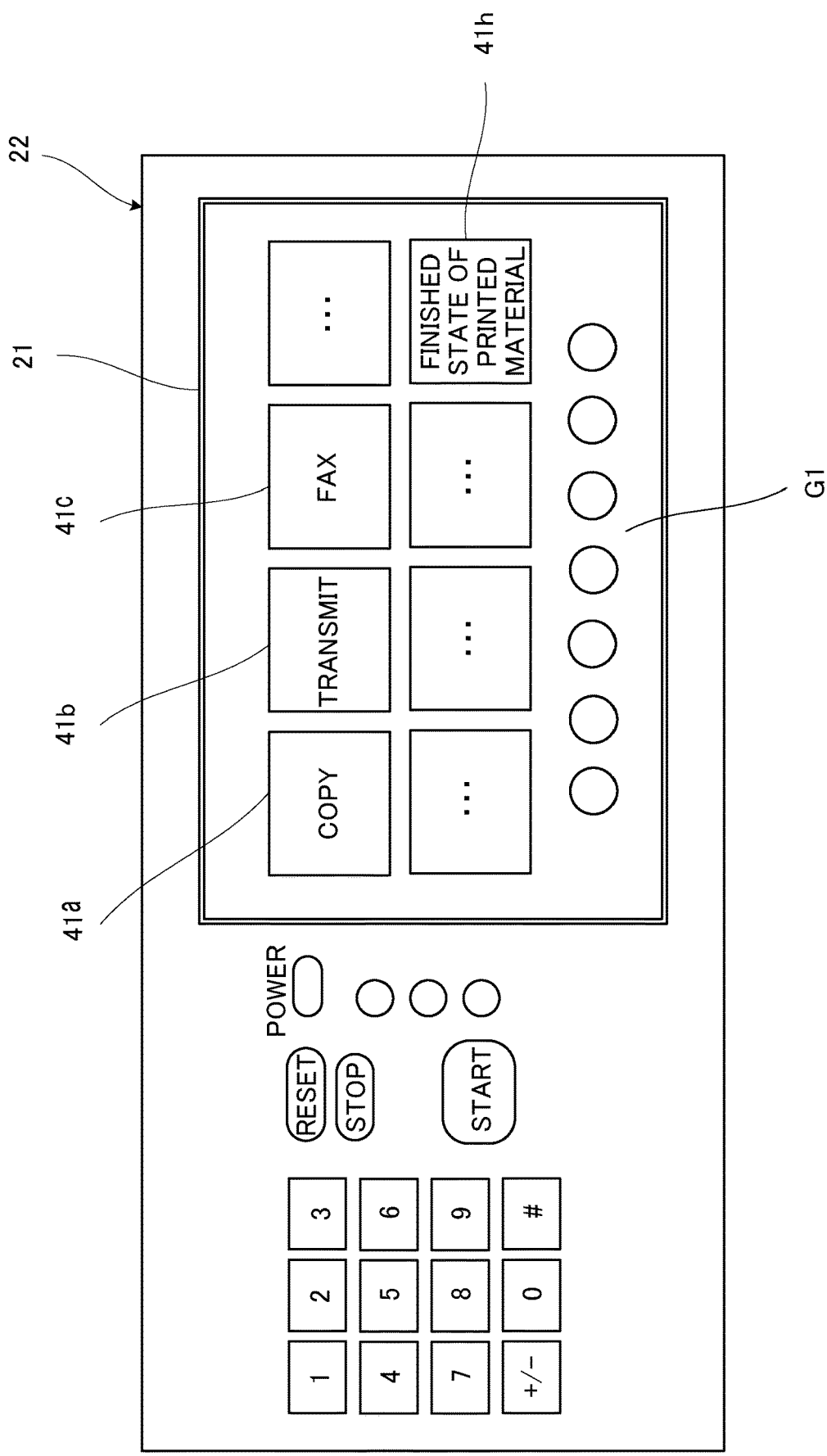

| IDENTIFIER OF FINISH ICON | FINISH ICON | IDENTIFIER OF FUNCTION ICON INDICATING FUNCTION FOR SETTING FINISHED STATE | | | | |
|---|---|---|---|---|---|---|
| FID(F1) |  | KID(K1) | KID(K2) | KID(K3) | KID(K5) | |
| FID(F2) |  | KID(K2) | KID(K3) | KID(K5) | KID(K8) | |
| FID(F3) |  | KID(K2) | KID(K4) | KID(K5) | KID(K9) | |
| | | | | | | |
| FID(F11) |  | KID(K1) | KID(K2) | KID(K3) | KID(K5) | KID(K6) |
| FID(F12) |  | KID(K1) | KID(K3) | KID(K5) | KID(K11) | |
| | | | | | | |

| IDENTIFIER OF FUNCTION ICON | FUNCTION ICON | IDENTIFIER OF FUNCTION ICON OF WHICH COMBINATION IS NOT ALLOWED |
|---|---|---|
| KID(K1) |  | |
| KID(K2) |  | KID(K11) |
| KID(K3) |  | |
| | | |
| KID(K10) |  | |
| KID(K11) |  | KID(K2) |

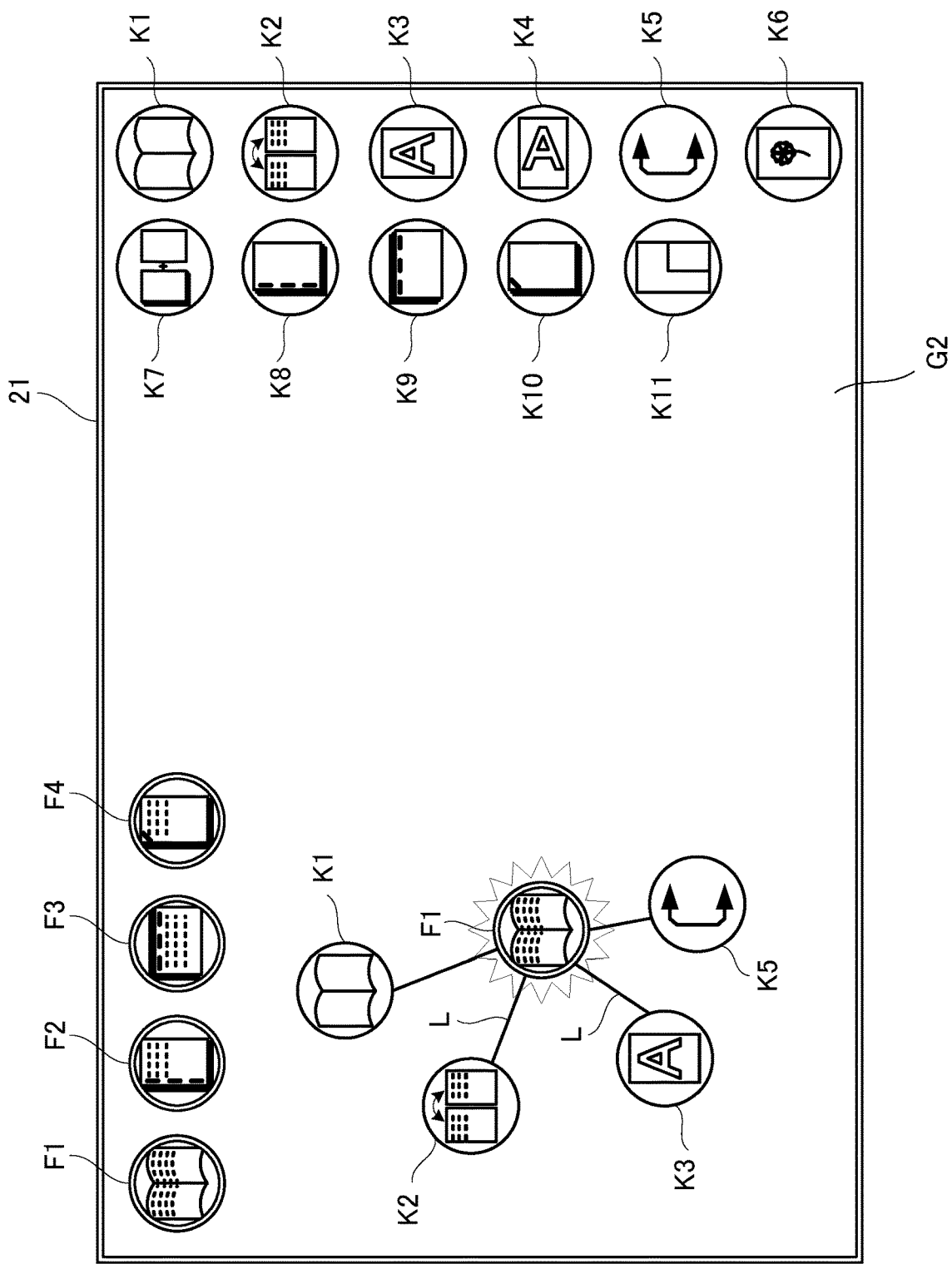

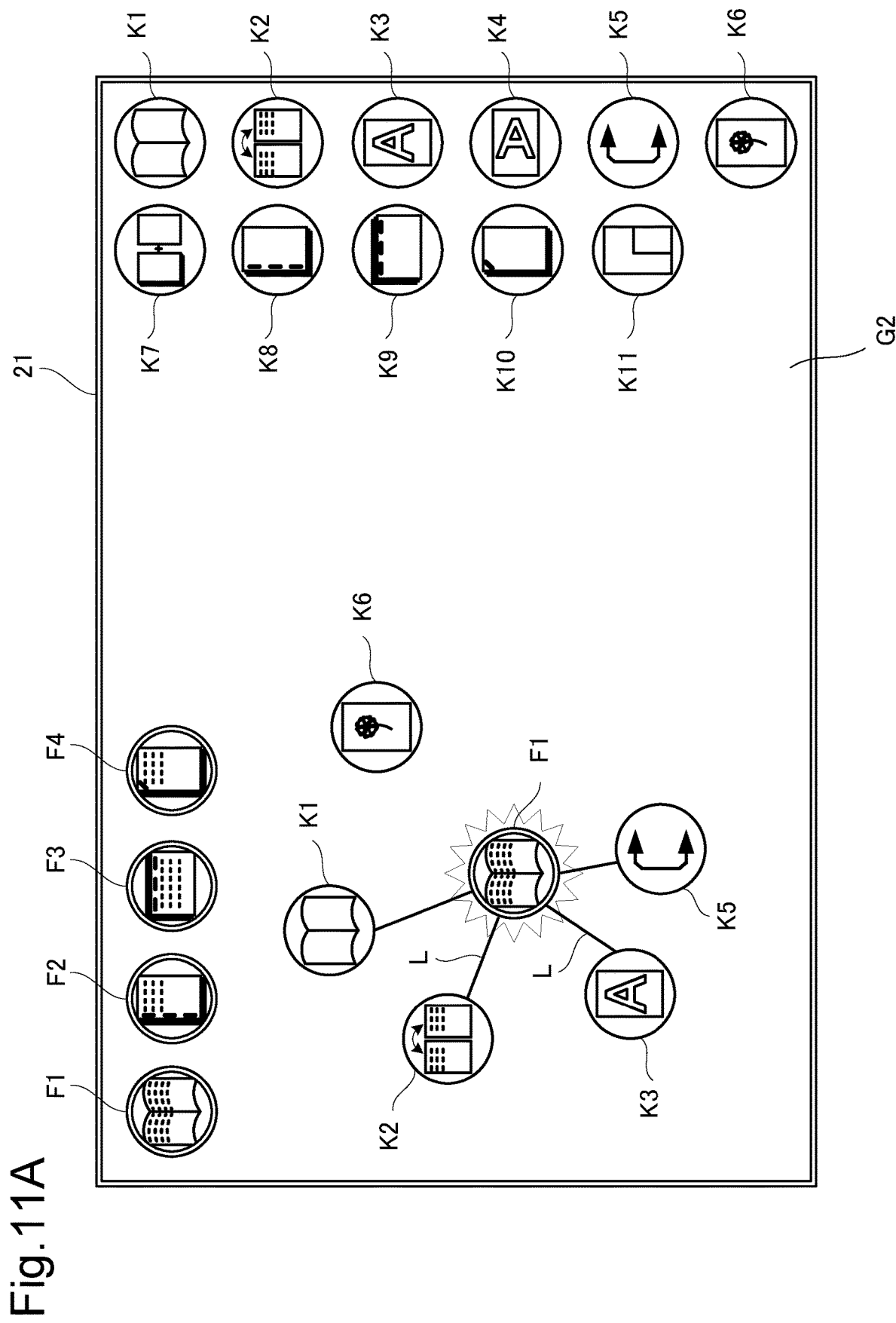

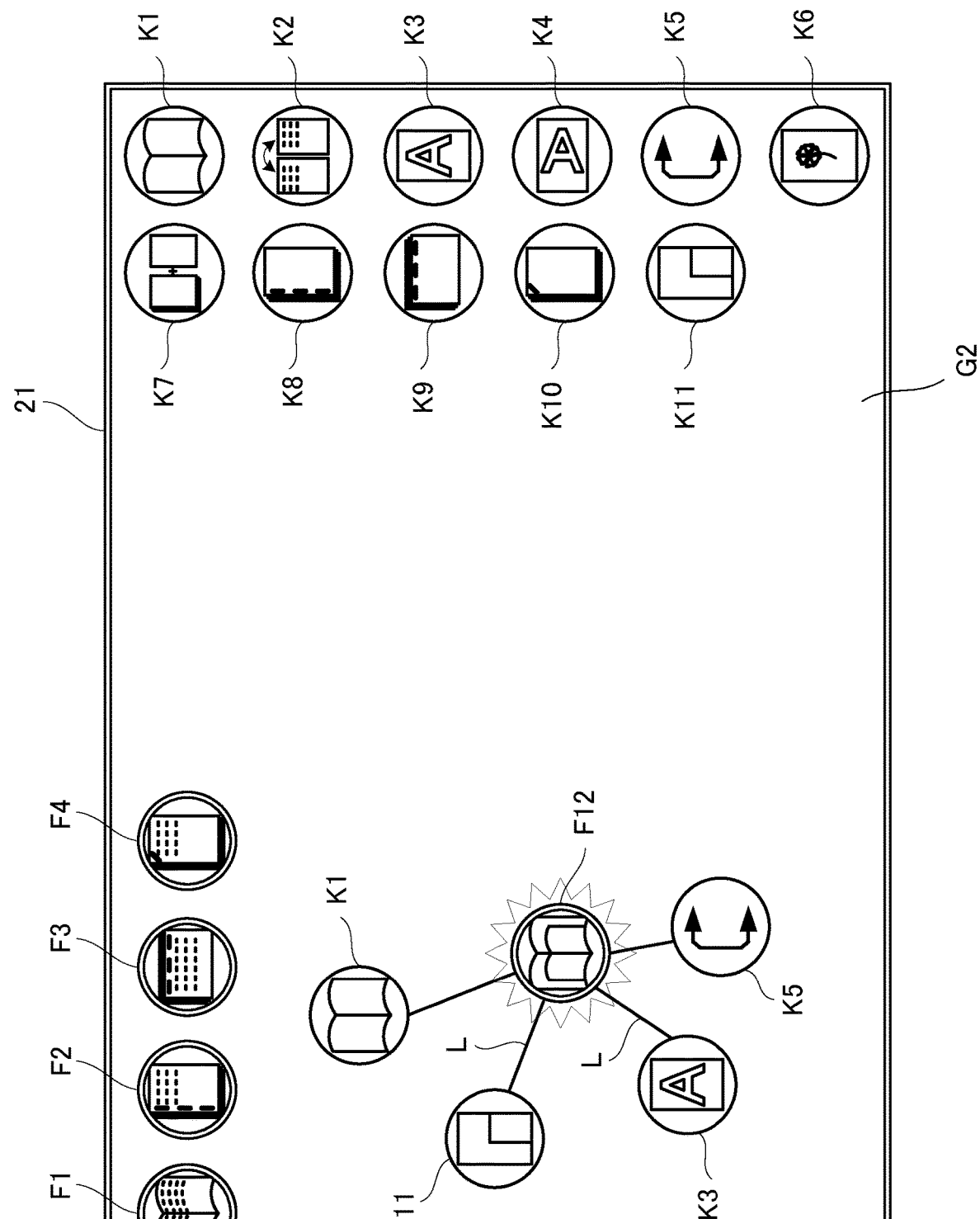

IMAGE FORMING APPARATUS FOR FORMING IMAGE ON RECORDING PAPER

INCORPORATION BY REFERENCE

This application claims priority to Japanese Patent Application No. 2019-002010 filed on Jan. 9, 2019, the entire contents of which are incorporated by reference herein.

BACKGROUND

The present disclosure relates to a technology allowing a user to set a finished state of printed material.

In an image forming apparatus, for example, when copying is executed, a plurality of functions such as double-sided printing, portrait or landscape printing on recording paper, and stapling are set, and an image is printed on the recording paper or post-processing of the recording paper is performed according to setting content of respective functions.

Further, in a general image forming apparatus, in displaying a preview image of a copy, the preview is displayed with, by distinguishing, initial copy conditions, and the copy conditions of a user set by user operation, and when release or addition of the copy conditions is instructed by user operation, the release or addition of the copy conditions is reflected in the preview image of the copy.

SUMMARY

As an aspect of the present disclosure, a technology for further improving the above technology is proposed.

An image forming apparatus according to an aspect of the present disclosure includes a display device, a storage device, and a control device. The storage device is configured to store respective finish icons indicating finished states of a plurality of types of printed material, respective function icons indicating a plurality of functions of setting finished states of the plurality of types of printed material, and, for each of the finish icons, a correspondence relationship between the finish icon and the respective function icon indicating the function of setting the finished state of the printed material indicated by the finish icon. The control device includes a processor and functions as a controller by the processor executing a control program. The controller is configured to read out the finish icon from the storage device, cause the display device to display, on a screen thereof, the finish icon, read out the function icon associated with the finish icon from the storage device on a basis of the correspondence relationship stored in the storage device, and cause the display device to display the function icon in association with the finish icon.

BRIEF DESCRIPTION OF THE DRAWINGS

FIG. 3B is a flowchart illustrating a process subsequent to FIG. 3A.

FIG. 4 is a diagram illustrating an initial screen of a display device of the image forming apparatus.

FIG. 6 is a diagram conceptually illustrating a data table in which finish icons and function icons have been stored in advance.

FIG. 7 is a diagram illustrating the setting screen of the display device on which the finish icon and the function icons are displayed in association with each other.

FIG. 11A is a diagram illustrating the setting screen of the display device on which the finish icon and function icons have been displayed in association with each other.

FIG. 12B is a diagram illustrating the setting screen of the display device on which another finish icon replaced due to a change of the function icon and the function icons have been displayed in association with each other.

DETAILED DESCRIPTION

Hereinafter, an image forming apparatus according to an embodiment of the present disclosure will be described with reference to the drawings.

Figure 1:
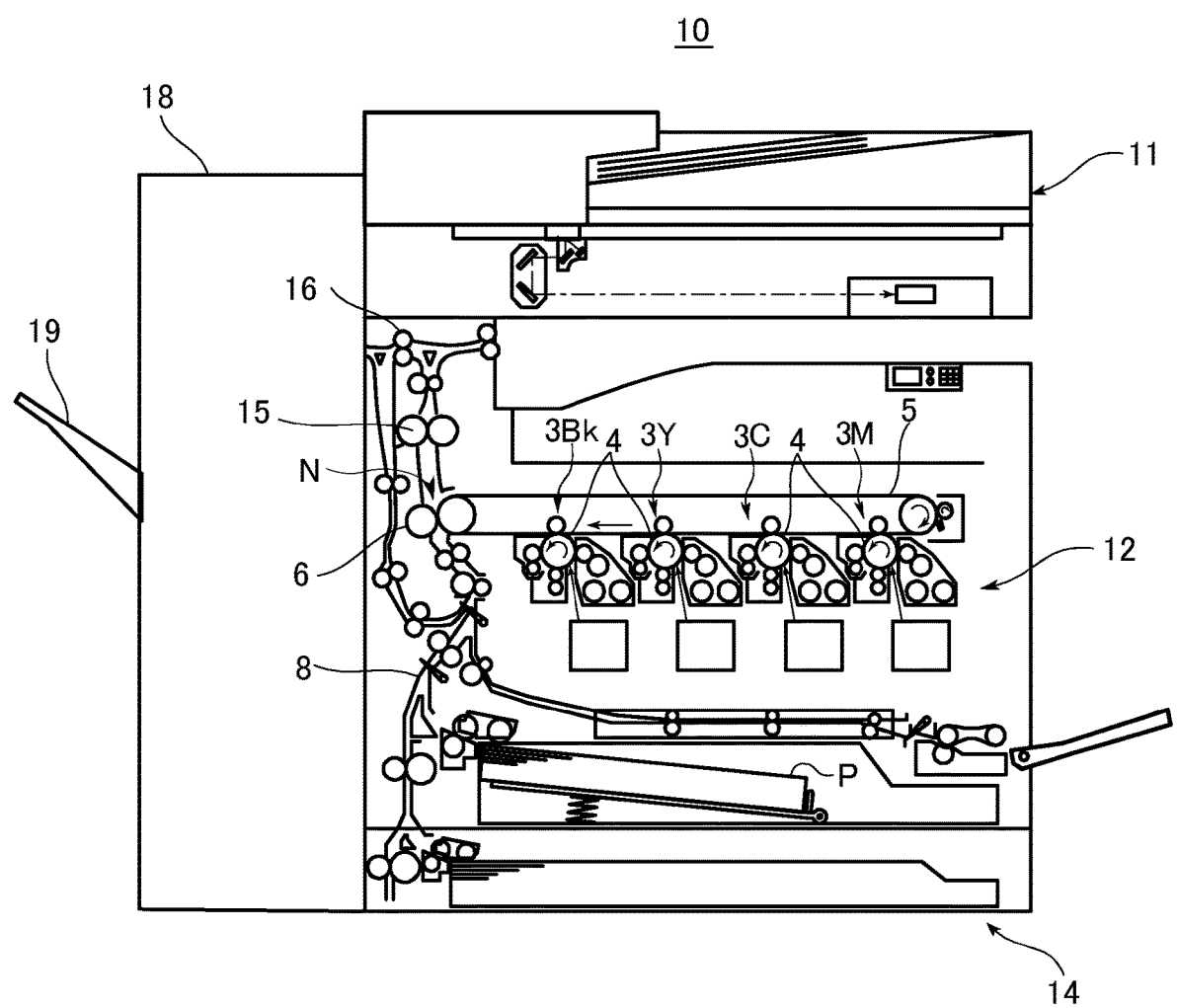
FIG. 1 is a cross-sectional view illustrating an image forming apparatus according to an embodiment of the present disclosure.

FIG. 1 is a cross-sectional view illustrating an image forming apparatus according to an embodiment of the present disclosure. As illustrated in FIG. 1, an image forming apparatus 10 according to the embodiment is a multifunction peripheral (MFP) having a plurality of functions such as a copy function, a printer function, and a facsimile function. This image forming apparatus 10 includes an image reading device 11, an image forming device 12, and a post-processor 18.

The image reading device 11 includes an image sensor that optically reads an image of a document. The image reading device 11 converts an analog output of the image sensor into a digital signal to generate image data indicating an image of the document.

The image forming device 12 forms the image of the document on recording paper. The image forming device 12 includes a magenta image forming device 3M, a cyan image forming device 3C, a yellow image forming device 3Y, and a black image forming device 3Bk. In any of the respective image forming devices 3M, 3C, 3Y, and 3Bk, a surface of a photosensitive drum 4 is uniformly charged, the surface of the photosensitive drum 4 is exposed, an electrostatic latent image is formed on the surface of the photosensitive drum 4, the electrostatic latent image on the surface of the photosensitive drum 4 is developed into a toner image, and the toner image on the surface of the photosensitive drum 4 is primarily transferred to an intermediate transfer belt 5. Accordingly, a color toner image is formed on the intermediate transfer belt 5. The color toner image is secondarily transferred to recording paper P conveyed from a paper supply device 14 through a conveyance path 8 in a nip region N between the intermediate transfer belt 5 and a secondary transfer roller 6.

Thereafter, the recording paper P is heated and pressed by a fixing device 15, the toner image on the recording paper P is fixed through thermocompression bonding, and the recording paper P is discharged to the post-processor 18 through discharge rollers 16.

The post-processor 18 is a mechanism that performs a stapling process, a middle folding process, or the like on the recording paper P or a bundle thereof, and discharges printed material consisting of the recording paper P or the bundle thereof to a discharge tray 19.

Figure 2:
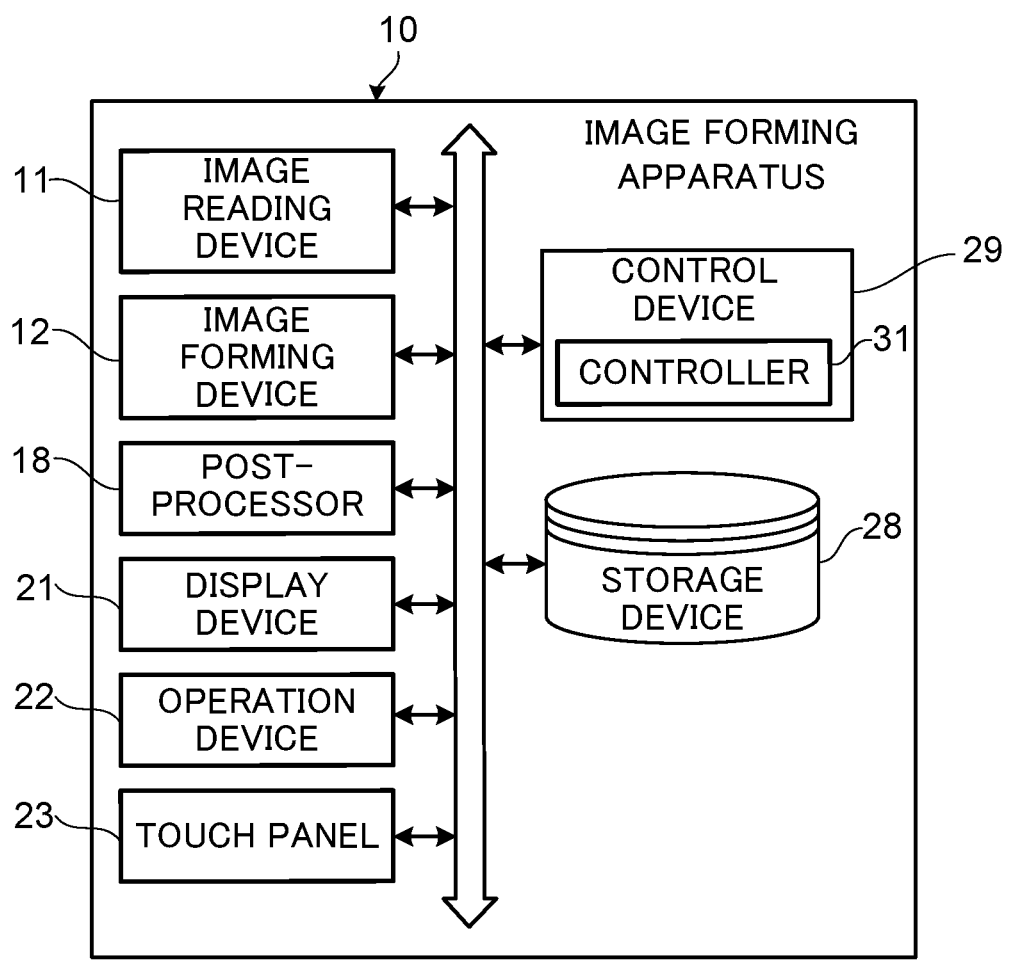
FIG. 2 is a block diagram illustrating a main internal configuration of the image forming apparatus of the embodiment.

FIG. 2 is a block diagram illustrating a main internal configuration of the image forming apparatus of the embodiment. As illustrated in FIG. 2, the image forming apparatus 10 of the embodiment includes the image reading device 11, the image forming device 12, a post-processor 18, a display device 21, an operation device 22, a touch panel 23, a storage device 28, and a control device 29. These components are configured to be able to transmit and receive data or signals through a bus.

The display device 21 is a display apparatus such as a liquid crystal display (LCD), or an organic EL (OLED: organic light-emitting diode) display. The operation device 22 includes physical keys such as a numeric keypad, an enter key, and a start key.

The touch panel 23 is disposed on a screen of the display device 21. The touch panel 23 is a touch panel of a so-called resistive film type, capacitance type, or the like. The touch panel 23 detects contact (touch) with the touch panel 23 of a finger of a user or the like, together with a contact position, and outputs a detection signal indicating coordinates of the contact position to, for example, a controller 31 of the control device 29 to be described below. This touch panel 23 serves as an operation device to which a user operation with respect to the screen of the display device 21 is input.

The storage device 28 is a large-capacity storage apparatus such as a solid state drive (SSD) or a hard disk drive (HDD), and stores various application programs or various pieces of data. Further, the storage device 28 has a data table DT illustrated in FIG. 6, which will be described below, stored therein in advance.

The control device 29 includes a processor, a random access memory (RAM), a read only memory (ROM), and the like. The processor is, for example, a central processing unit (CPU), an application specific integrated circuit (ASIC), or a micro processing unit (MPU). The control device 29 functions as the controller 31 by a control program stored in the ROM or the storage device 28 being executed by the processor.

The controller 31 collectively controls the image forming apparatus 10. The control device 29 is connected to the image reading device 11, the image forming device 12, the post-processor 18, the display device 21, the operation device 22, the touch panel 23, the storage device 28, and the like. The controller 31 performs control of an operation of these components or transmission and reception of signals or data to and from each component.

The controller 31 serves as a processor that executes, for example, various processes necessary for image formation in the image forming apparatus 10. The controller 31 receives an operation instruction input by the user on the basis of a detection signal output from the touch panel 23 or an operation with respect to the physical keys of the operation device 22. Further, the controller 31 has a function of controlling a display operation of the display device 21.

In the image forming apparatus 10 having such a configuration, the user operates the operation device 22 or the touch panel 23 to select a copy job and instruct execution of the copy job. In response to the copy job execution instruction, the controller 31 causes the image reading device 11 to read an image of a document, causes the image forming device 12 to record the image of the document on recording paper, and causes the post-processor 18 to perform post-processing on the recording paper.

Further, the controller 31 causes the display device 21 to display a finished state of the printed material (the recording paper or the bundle thereof) due to the copy job and a function of setting the finished state of the printed material on the screen of the display device 21, prior to execution of the copy job. The controller 31 receives an input of an instruction to change the finished state of the printed material through deleting, adding, or changing of a function, which is input from the user through the touch panel 23.

Figure 3A:
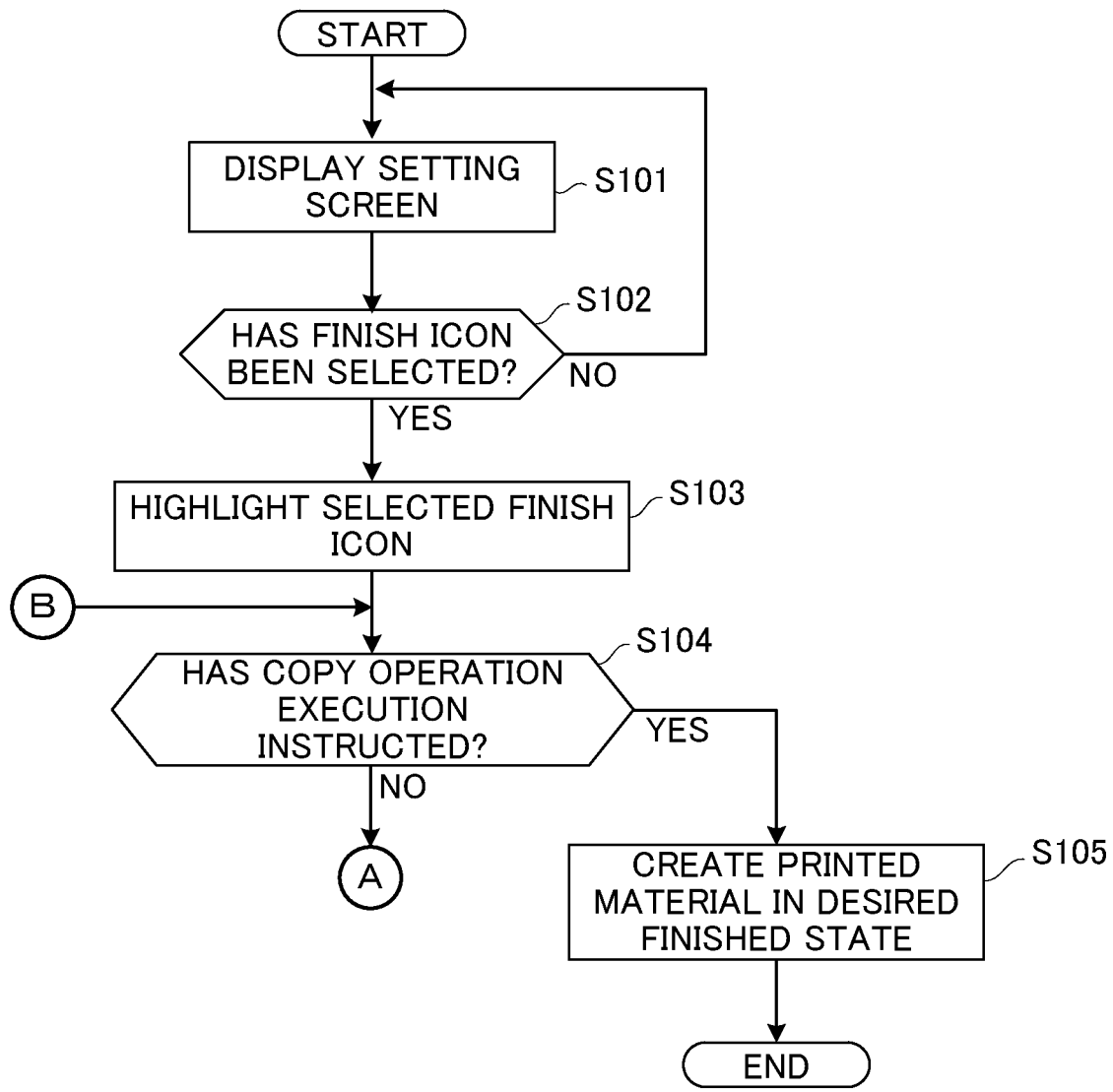
FIG. 3A is a flowchart illustrating a process of confirming a function of setting a finished state of printed material or changing the finished state of the printed material by deleting, adding, or changing the function, while viewing the finished state of the printed material.

Next, a process of displaying the finished state of the printed material and the function of setting the finished state of the printed material will be described in detail with reference to flowcharts illustrated in FIGS. 3A and 3B.

It is assumed that the controller 31 is causing the display device 21 to display an initial screen G1 as illustrated in FIG. 4. A plurality of function keys 41*a* to 41*h* associated with respective functions, for example, are displayed on the initial screen G1. In a case in which the user touches the function key 41*h* for setting the finished state of the printed material when the initial screen G1 is displayed, the controller 31 receives an instruction to start a process of setting the finished state of the printed material through the touch panel 23, and causes the display device 21 to display a setting screen G2 for setting the finished state of the printed material as illustrated in FIG. 5 (S101).

Figure 5:
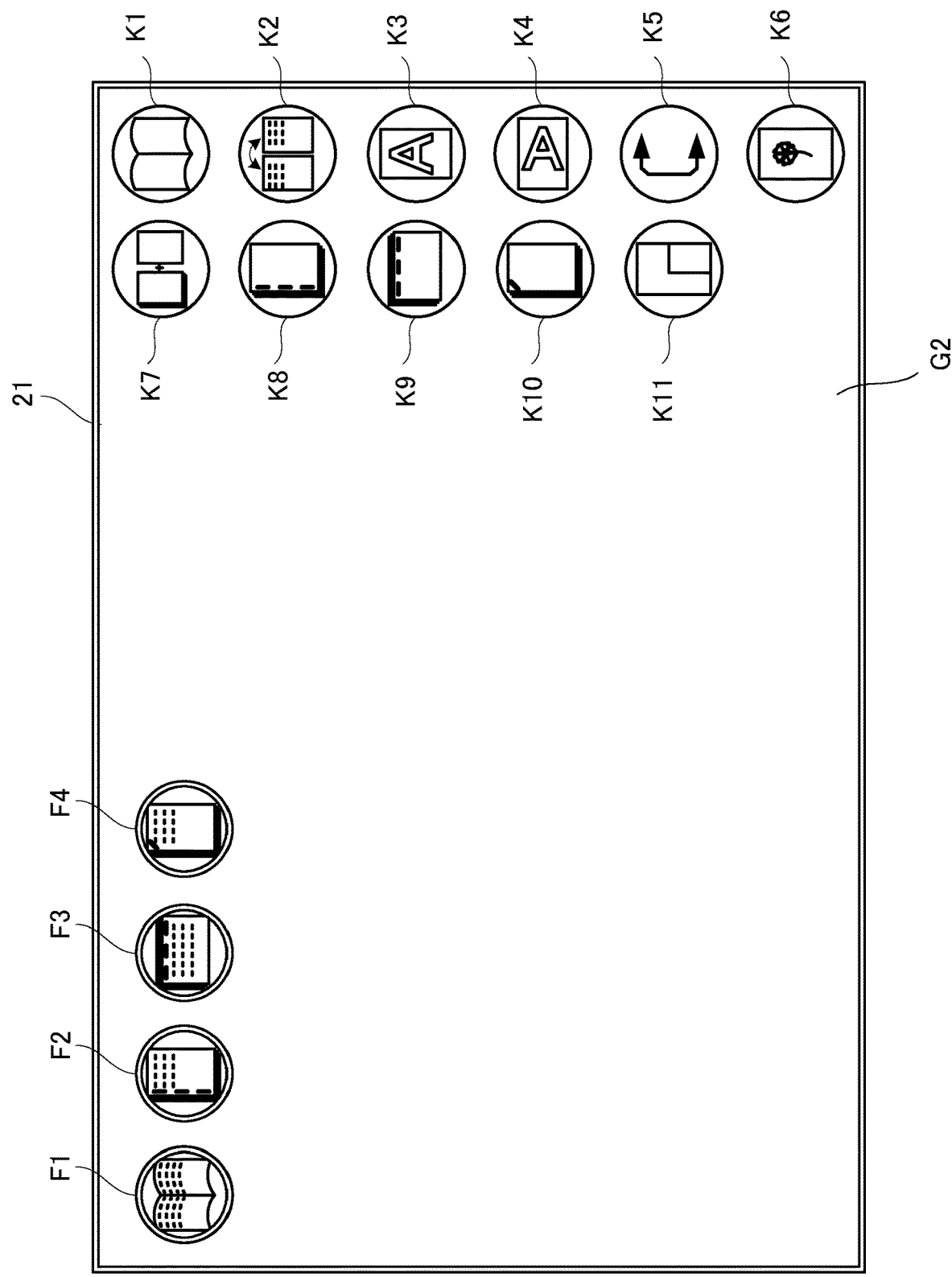
FIG. 5 is a diagram illustrating a setting screen of the display device for setting the finished state of the printed material.

Respective finish icons F1, F2, and so on indicating finished states of a plurality of types of printed material, and respective function icons K1, K2, and so on indicating a plurality of functions of setting the finished states of the plurality of types of printed material are arranged and displayed on the setting screen G2 illustrated in FIG. 5. Further, the respective finish icons F1, F2, and so on and the respective function icons K1, K2, and so on are displayed in different display forms (different colors as an example in the embodiment). For functions associated with the respective function icons and indicated by the respective function icons, for example, the function icon K1 indicates saddle stitching, the function icon K2 indicates double-sided printing, the function icon K3 indicates portrait printing, the function icon K4 indicates landscape printing, the function icon K5 indicates stapling, the function icon K6 indicates high-quality printing, the function icon K7 indicates 2 in 1, the function icon K8 indicates vertical binding, the function icon K9 indicates horizontal binding, the function icon K10 indicates one-point binding, and the function icon K11 indicates reduction. The finished state of the printed material indicated by the finish icon is achieved through execution of the function associated with at least one of the function icons.

Such a setting screen G2 is displayed on the display device 21 by the controller 31 on the basis of a correspondence relationship indicated by a data table DT illustrated in FIG. 6, which has been stored in the storage device 28 in advance. In the data table DT illustrated in FIG. 6, the respective finish icons F1, F2, and so on are stored in association with identifiers KID of the respective finish icons F1, F2, and so on. Further, an identifier KID of the function icon indicating the function of setting the finished state of the printed material indicated by the finish icon is stored for each of the finish icons F1, F2, and so on in the data table DT. Further, identifiers KID of other function icons of which a combination with the function icons K1, K2, and so on is not allowed are stored for the respective function icons K1, K2, and so on in the data table DT. Images indicating the finish icons F1 to F4 and the function icons K1 to K11 are also stored in the data table DT. The controller 31 reads out the images of the respective finish icons F1 to F4 and the respective function icons K1 to K11 from the data table DT and causes the display device 21 to display the images on the setting screen G2.

Here, it is assumed that the user touches a desired finish icon on the setting screen G2 of the display device 21 to select the finish icon. In this case, the controller 31 receives an input of an instruction to select the finish icon through the touch panel 23 (S102). When the finish icon F1 is selected ("Yes" in S102), the controller 31 moves the finish icon F1 to a free space on the setting screen G2 of the display device 21 and highlights the finish icon F1 as illustrated in FIG. 7 according to the selection (S103). The highlighting is a display performed, for example, by blinking the icon or increasing a brightness of the icon (hereinafter, a case in which the finish icon F1 has been selected will be described as an example).

Further, the controller 31 searches the data table DT for the identifiers KID of the respective function icons associated with the selected finish icon, reads out the images of the respective function icons associated with the identifier KID from the data table DT, arranges and causes the display device 21 to display the function icons around the finish icon F1 on the setting screen G2, and displays an image of a line connecting the finish icon F1 to the function icon (hereinafter referred to as a line L) for each function icon. Accordingly, the user can ascertain the functions that need to be executed to set the finished state of the printed material indicated by the finish icon F1, on the basis of the images indicated by the respective function icons displayed as described above.

An example in which the respective function icons K1, K2, K3, and K5 are displayed in association with the finish icon F1 on the setting screen G2 of the display device 21 illustrated in FIG. 7 is shown. The function icon K1 indicates saddle stitching, and this saddle stitching function is executed by the post-processor 18. The function icon K2 indicates double-sided printing, and this double-sided printing function is executed by the image forming device 12. The function icon K3 indicates portrait printing on the recording paper, and this portrait printing function is executed by the image forming device 12. The function icon K5 indicates stapling, and this stapling function is executed by the post-processor 18.

Thereafter, when the user operates the start key of the operation device 22, the controller 31 receives a copy operation execution instruction ("Yes" in S104), and sets the finished state indicated by the highlighted finish icon F1 as the finished state of image formation. According to the copy operation execution instruction, the controller 31 causes the image reading device 11 to sequentially read images of a plurality of documents, executes respective functions of the saddle stitching, the double-sided printing, and portrait printing, and the stapling indicated by the respective function icons K1, K2, K3, and K5, causes the image forming device 12 to form images of the respective documents on both sides of the respective sheets of recording paper, causes the post-processor 18 to perform a stapling process on the respective sheets of recording paper, and creates printed material in the finished state of the printed material indicated by the finish icon F1 (S105). After S105, the process ends.

Further, it is assumed that the user has touched an arbitrary function icon associated with the finish icon without operating the start key of the operation device 22. In this case, the controller 31 does not receive the copy operation execution instruction ("No" in S104) and receives an instruction to select the touched function icon through the touch panel 23 ("Yes" in S106).

In this case, the controller 31 searches the data table DT for other finish icons associated with the identifier KID of the selected function icon, arranges and causes the display device 21 to display the other finish icons around the selected function icon on the setting screen G2 (S107), and display a line L connecting the other finish icons to the selected function icon (S107). In this case, since the finish icon F1 associated with the identifier KID of the selected function icon has already been displayed, the controller 31 does not causes the display device 21 to redundantly display the finish icon F1 and additionally causes the display device 21 to display only the other finish icons. Further, when there are a large number of other finish icons associated with the identifier KID of the selected function icon, the controller 31, for example, selects other finish icons having a lowest arrangement order to a third lowest arrangement order among the plurality of other finish icons in the data table DT of FIG. 6, arranges and causes the display device 21 to display the three selected other finish icons around an arbitrary function icon on the setting screen G2, and display lines L connecting the three selected other finish icons to the selected function icon.

Figure 8:
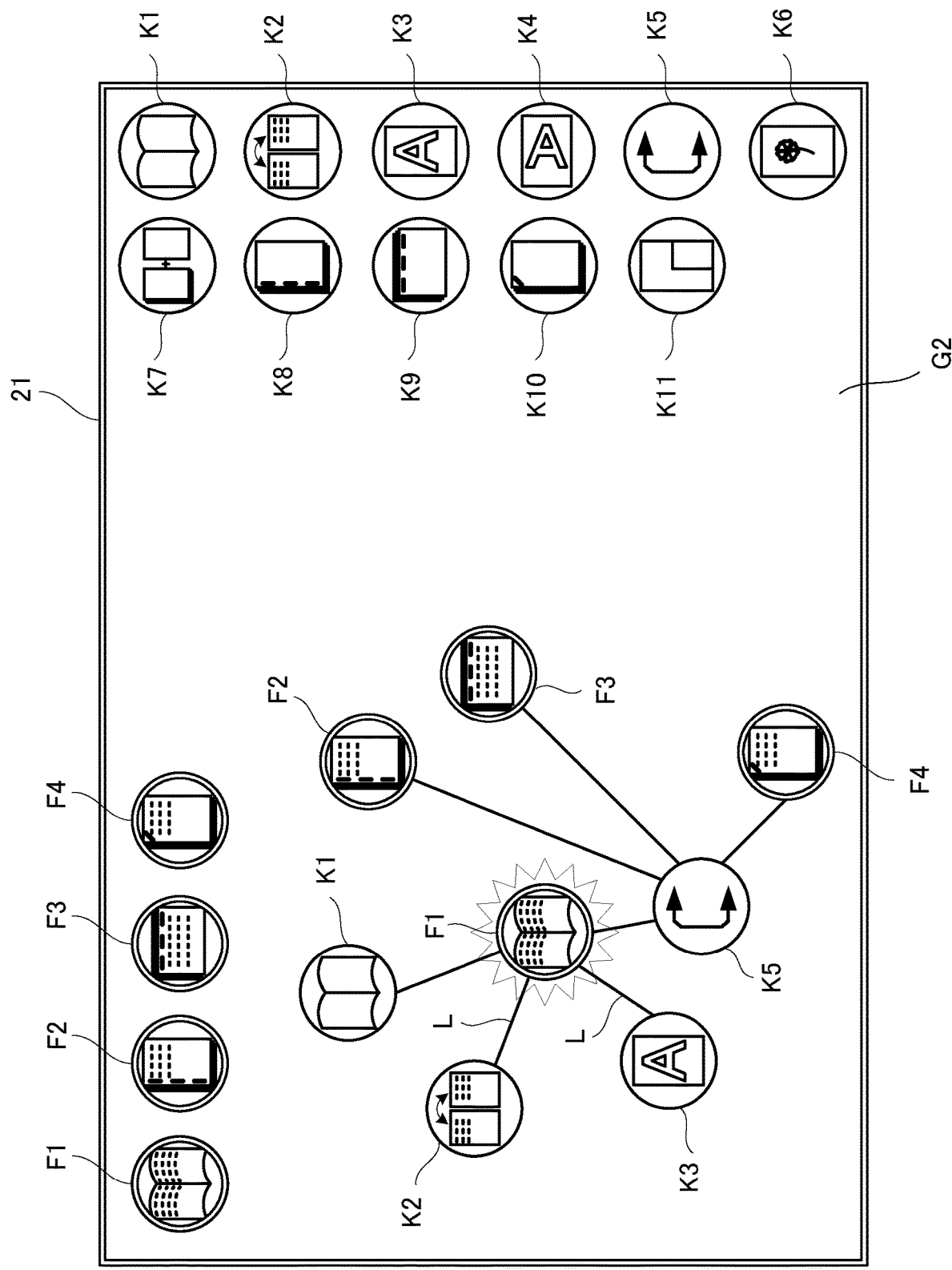
FIG. 8 is a diagram illustrating the setting screen of the display device on which the function icon touched and other finish icons associated with the function icon touched have been displayed in association with each other.

For example, when the function icon K5 indicating stapling is selected through a touch operation by the user on the setting screen G2 illustrated in FIG. 7, the controller 31 searches the data table DT for the respective other finish icons F2, F3, and F4 associated with the identifier KID of the function icon K5, arranges and displays the respective other finish icons F2, F3, and F4 around the function icon K5 on the setting screen G2 of the display device 21, and displays respective lines L connecting the respective other finish icons F2, F3, and F4 to the function icon K5, as illustrated in FIG. 8. Thereby, it is possible to allow the user to ascertain the finished state of the printed material, which can be set by the function indicated by the selected function icon.

When the user further touches the other finish icon displayed in S107 in this state, the controller 31 receives an instruction to select the touched other finish icon through the touch panel 23 ("Yes" in S108), stops the highlighting of the finish icon F1, and highlights the selected other finish icon on the setting screen G2 of the display device 21. Further, the controller 31 searches the data table DT for the identifiers KID of further function icons associated with the selected other finish icon, reads out images of the further function icons associated with the identifier KID from the data table DT, arranges and causes the display device 21 to display the further function icons around the other finish icon, and display a line L connecting the other finish icon to the function icons (S120).

Figure 9:
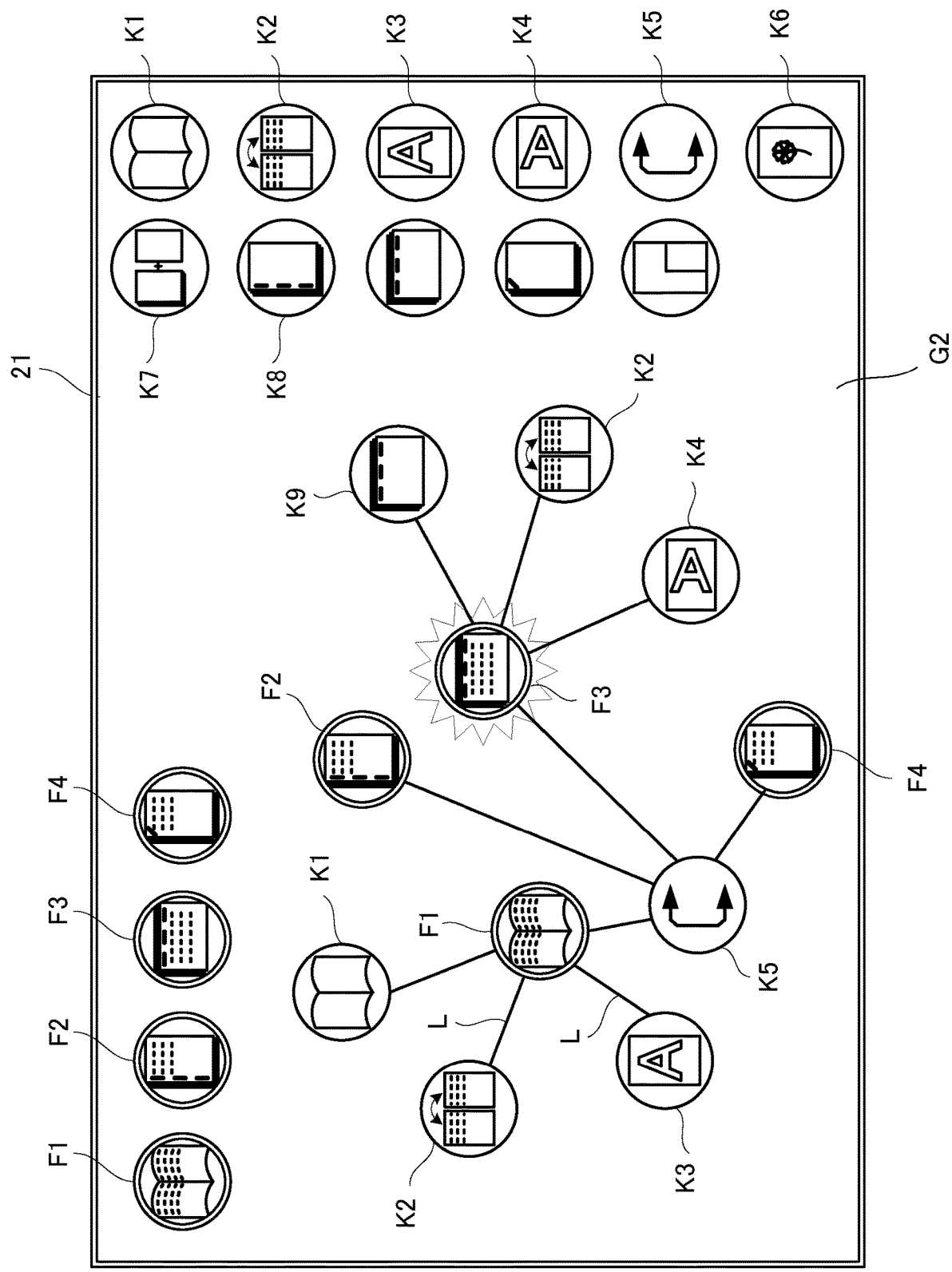
FIG. 9 is a diagram illustrating the setting screen of the display device on which another finish icon touched and the function icons have been displayed in association with each other.

In S120, the controller 31 stops the highlighting of the finish icon F1, and highlights the finish icon F3, as illustrated in FIG. 9. Further, the controller 31 causes the display device 21 to additionally display the respective function icons K2, K4, and K9 associated with the finish icon F3 (other than the function icon K5 already associated with the finish icon F3), and display respective lines L connecting the finish icon F3 to the respective function icons K2, K4, K5, and K9. The respective function icons K2 and K5 are as described above. The function icon K4 indicates landscape printing on the recording paper, and a function of this landscape printing is executed by the image forming device 12. The function icon K9 indicates horizontal binding, and a function of this horizontal binding is executed by the post-processor 18.

In this state, when the user operates the start key of the operation device 22, the controller 31 receives a copy operation execution instruction ("Yes" in S104), and sets the finished state indicated by the highlighted finish icon F3 as the finished state of image formation. According to the copy operation execution instruction, the controller 31 causes the image reading device 11 to sequentially read images of a plurality of documents, executes the respective functions of double-sided printing, and landscape printing, stapling, and horizontal binding indicated by the respective function icons K2, K4, K5, and K9, causes the image forming device 12 to form images of the documents on both sides of the respective sheets of recording paper, causes the post-processor 18 to perform a stapling process on the respective sheets of recording paper, and creates printed material in the finished state of the printed material indicated by the finish icon F3 (S105). After S105, the process ends.

When the other finish icon displayed in S107 has not been touched in S108 ("No" in S108), the controller 31 does not highlight the other finish icon, does not display the function icons associated with the other finish icon, continues the highlighting of the finish icon F1, and proceeds to the process of S104.

Therefore, when a copy operation execution instruction is not received in S104 ("No" in S104), yet another function icon is touched by the user again, and an instruction to select the other function icon is received ("Yes" in S106), the controller 31 repeats the process of S107 for the other function icon.

Next, a case in which the controller 31 does not receive the copy operation execution instruction in S104 and does not receive an instruction to select any one of function icons in S106, and the user has performed a slide operation of crossing the line L connecting the finish icon to the function icon with respect to the line L on the setting screen G2 of the display device 21 will be described.

When the controller 31 detects the slide operation of crossing the line L connecting the finish icon to the function icon through the touch panel 23 ("Yes" in S109), the controller 31 cancels an association display of the finish icon (an original finish icon) and the function icon, and searches the data table DT for the identifiers KID of other function icons other than the function icon of which the association display has been canceled. The controller 31 reads out the other finish icons associated with all of these identifiers KID from the data table DT. The controller 31 hides the original finish icon on the setting screen G2 of the display device 21 and highlights the other finish icons (S110). The controller 31 arranges and causes the display device 21 to display the other function icons around the other finish icon. The controller 31 causes the display device 21 to display respective lines L connecting the other finish icon to the other function icons (other than the function icon of which the association display has been canceled). The association display means displaying each function icon around the finish icon and displaying a line L connecting both of the icons.

In this case, when the controller 31 has determined that there are yet other function icons associated with the other finish icon on the basis of the data table DT, the controller 31 further causes the display device 21 to display the other function icons around the other finish icon and display respective lines L connecting the other finish icon to the other function icon.

Further, there may be a plurality of other finish icons associated with the identifiers KID of all the other function icons of which the association display has not been canceled. In this case, the controller 31, for example, selects the other finish icon having the lowest arrangement order in the data table DT of FIG. 6, displays (highlights) the selected other finish icon in place of the original finish icon F1 on the setting screen G2 of the display device 21, and causes the display device 21 to display a line L connecting the other finish icon to the other function icon or the like.

Figure 10A:
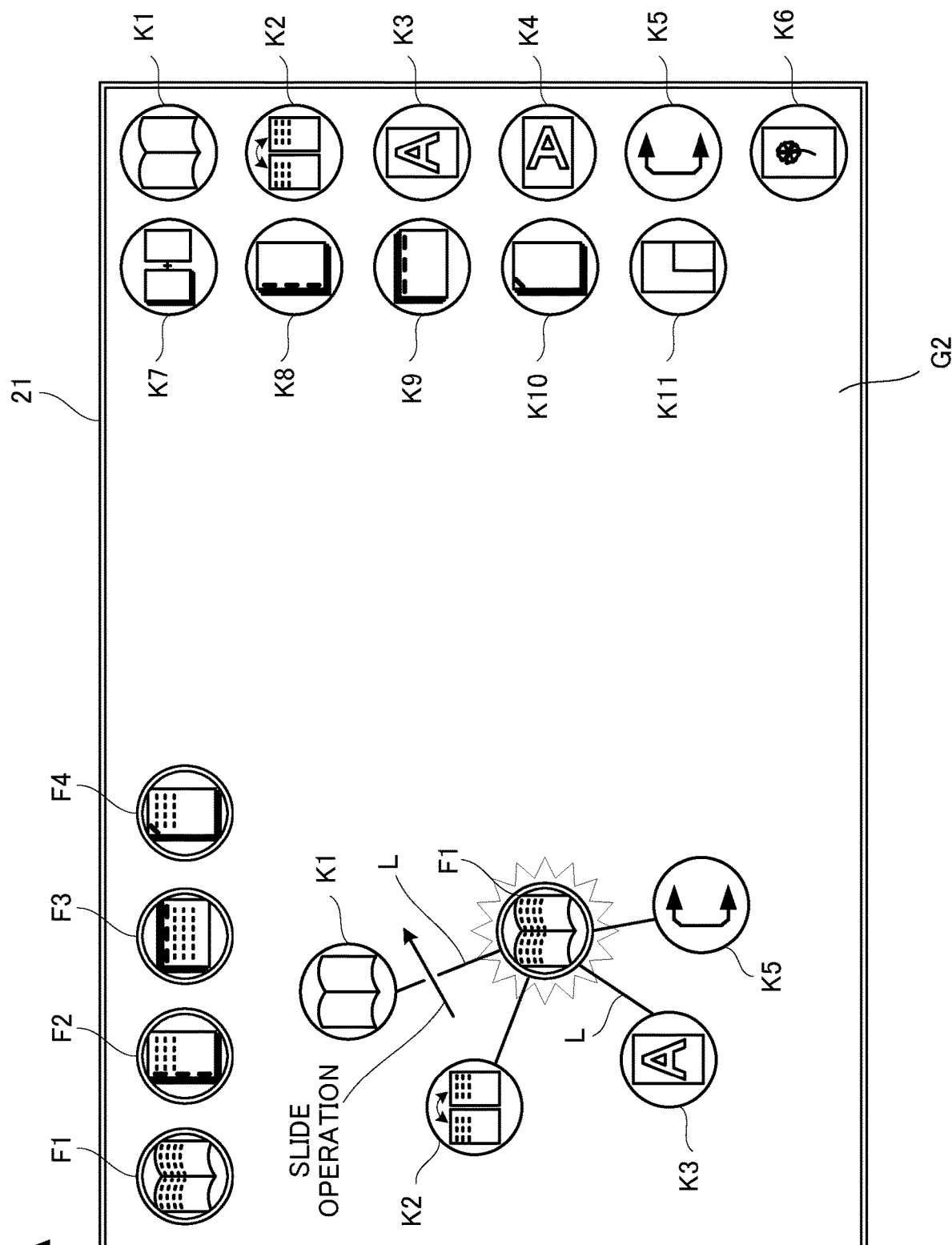
FIG. 10A is a diagram illustrating the setting screen of the display device on which the finish icon and the function icons have been displayed in association with each other.
Figure 10B:
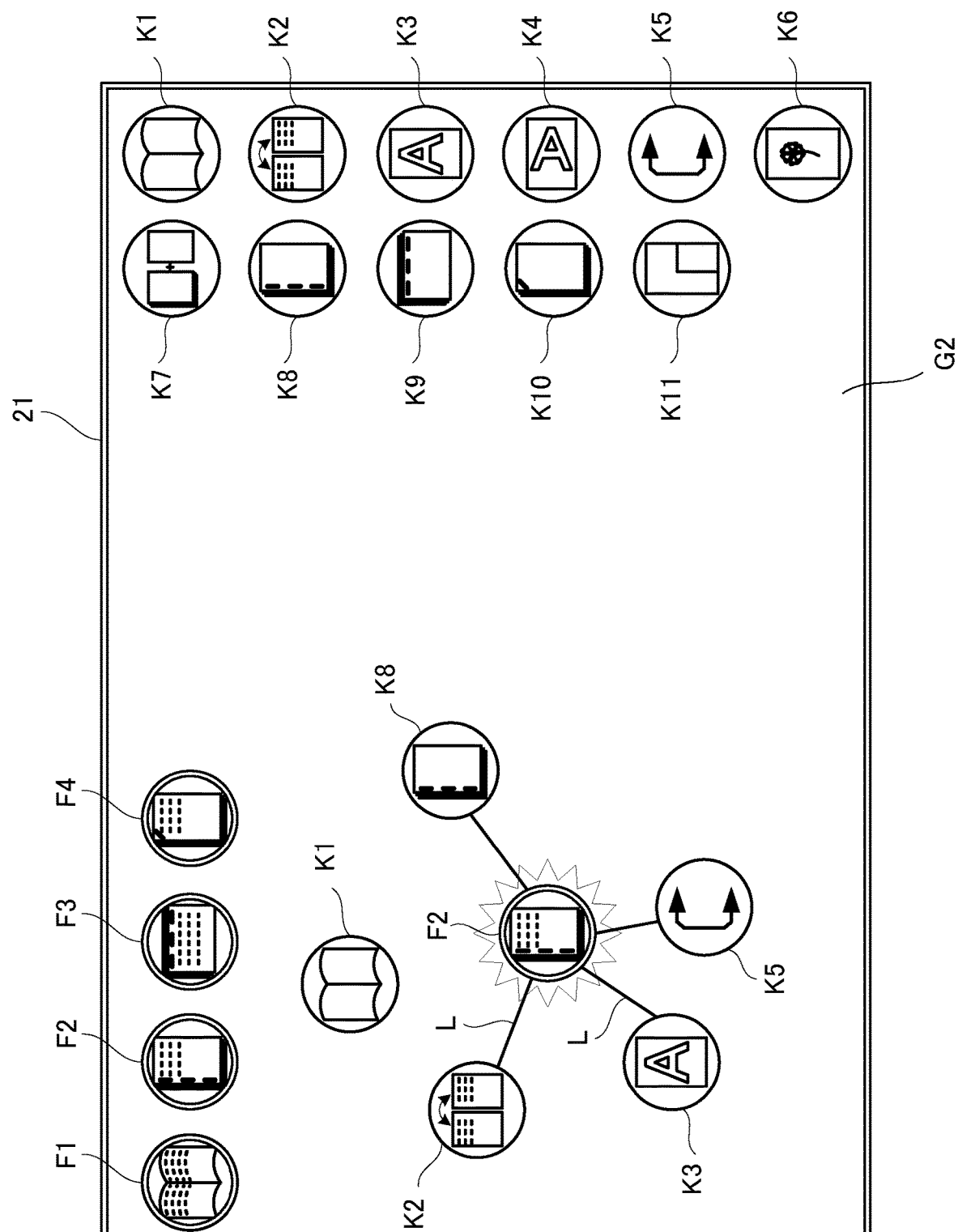
FIG. 10B is a diagram illustrating the setting screen of the display device on which another finish icon, replaced due to cancelation of the function icon, and the function icons have been displayed in association with each other.

For example, when a slide operation of crossing the line L connecting the finish icon F1 to the function icon K1 in association with each other is performed in a state in which the finish icon F1 is associated with the function icons K1, K2, K3, and K5 as illustrated in FIG. 10A, the controller 31 cancels the association display of the function icon K1 with the finish icon F1, searches the data table DT for the identifiers KID of the respective other function icons K2, K3, and K5 of which the association display with the finish icon F1 has not been canceled, reads out the other finish icons (here, the finish icon F2) associated with each searched identifier KID from the data table DT, and causes the display device 21 to display (highlights) the other finish icon F2 in place of the original finish icon F1, as illustrated in FIG. 10B.

Further, the controller 31 arranges and displays the respective other function icons K2, K3, and K5 around the other finish icon F2, and causes the display device 21 to display respective lines L connecting the other finish icon F2 to the respective other function icons K2, K3, and K5. When the identifier KID of the other function icon K8 is further associated with the other finish icon F2, the controller 31 reads out the other function icon K8 from the data table DT, arranges and causes the display device 21 to display the other function icon K8 around the other finish icon F2, and display a line L connecting the other finish icon F2 to the other function icon K8.

After S110, the process proceeds to S104. When the controller 31 receives an input of the copy operation execution instruction on the basis of an operation of the user with respect to the start key of the operation device 22 in S104 in a state in which the finish icon F2 is highlighted as described above ("Yes" in S104), the controller 31 causes the image reading device 11 to sequentially read images of a plurality of documents, executes functions of double-sided printing, portrait printing, stapling, and vertical binding indicated by the respective function icons K2, K3, K5, and K8, and creates the finished state of the printed material indicated by the finish icon F2 using the image forming device 12 and the post-processor 18 (S105). Thereafter, the process ends.

Next, a process in a case in which the controller 31 does not receive the copy operation execution instruction in S104 and does not receive the instruction to select any one of function icons in S106, and the user has performed an operation for arranging an arbitrary function icon near the highlighted finish icon through a drag-and-drop operation with respect to the arbitrary function icon on the setting screen G2 of the display device 21 will be described. Here, it is assumed that the user has not performed the slide operation of crossing the line L connecting the finish icon to the function icon with respect to the line L ("No" in S109).

In this case, a drag-and-drop operation with respect to an arbitrary function icon among the function icons K1 to K11 displayed in parallel on the setting screen G2 is performed by the user, and when the controller 31 detects that the arbitrary function icon has been dragged to a position near the highlighted finish icon through the touch panel 23, the controller 31 receives the detected drag operation as an instruction to add the arbitrary function icon (hereinafter referred to as an addition target function icon) and perform an association display with the finish icon ("Yes" in S111).

For each function icon already associated with the finish icon, the controller 31 determines whether or not a combination of the function indicated by the function icon with the function indicated by the addition target function icon is allowed (S112). The controller 31 determines whether or not a combination of the function indicated by each function icon already associated with the finish icon with the function indicated by the addition target function icon is allowed (S112). The controller 31 determines that the combination is allowed when the other finish icon associated in common with all of the identifier KID of the addition target function icon and the identifiers KID of the respective function icons already associated is present in the data table DT, and determines that the combination is not allowed when the other finish icon associated in common with all of the identifiers KID is not present in the data table DT.

When the controller 31 has determined that the combination is allowed ("Yes" in S112), the controller 31 reads out another finish icon associated with all the identifiers KID in common from the data table DT, displays (highlights) the read-out other finish icon in place of the original finish icon F1 on the setting screen G2 of the display device 21, arranges and causes the display device 21 to display the respective function icons and the addition target function icons already associated with the finish icon around the other finish icon, and display respective lines L connecting each function icon and the addition target function icons associated with the finish icon to the other finish icon (S113).

Figure 11B:
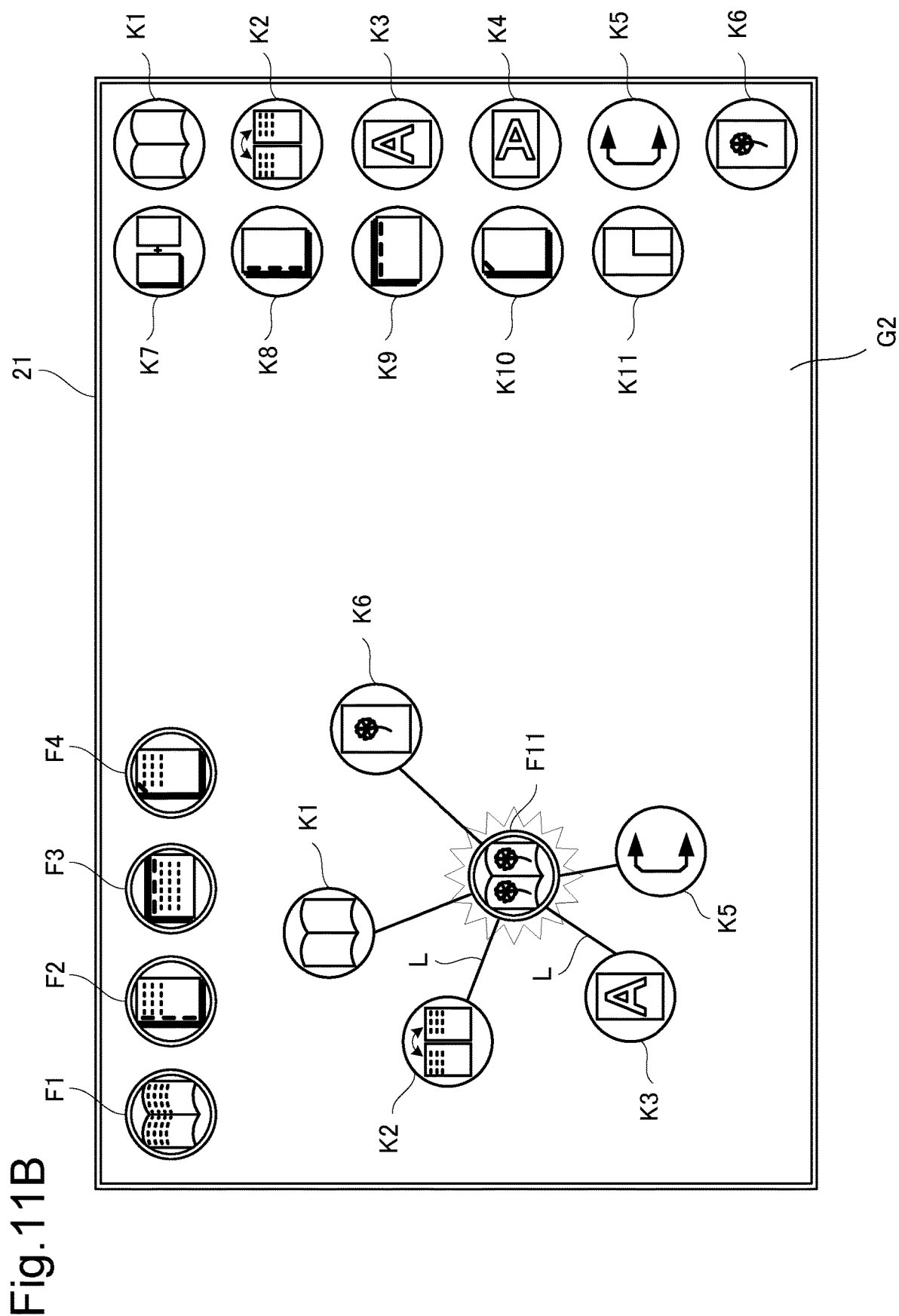
FIG. 11B is a diagram illustrating the setting screen of the display device on which another finish icon replaced due to addition of a function icon and function icons have been displayed in association with each other.

For example, when a combination of the respective functions indicated by the respective function icons K1, K2, K3, and K5 already associated with the finish icon F1 with a function indicated by an addition target function icon K6 is allowed in a case in which an arbitrary function icon K6 has been arranged near the finish icon F1 as illustrated in FIG. 11A in a state in which the finish icon F1 is associated with the respective function icons K1, K2, K3, and K5, another finish icon F11 associated with the respective identifiers KID is read out from the data table DT, the other finish icon F11 is displayed (highlighted) in place of the original finish icon F1 as illustrated in FIG. 11B, the respective function icons K1, K2, K3, K5, and K6 are arranged and displayed around the other finish icon F11, and respective lines L connecting the other finish icon F11 to the respective function icons K1, K2, K3, K5, and K6 are displayed. The respective function icons K1, K2, K3, and K5 are as described above. Further, the function icon K6 indicates high-quality printing, and a function of this high-quality printing is executed by the image forming device 12.

After S113, the process proceeds to S104. When the controller 31 receives an input of the copy operation execution instruction on the basis of the operation of the user with respect to the start key of the operation device 22 in S104 in a state in which the finish icon F11 is highlighted as described above ("Yes" in S104), the controller 31 causes the image reading device 11 to sequentially read images of a plurality of documents, causes the image forming device 12 to record the image of each document on both sides of each sheet of recording paper according to the saddle stitching, double-sided printing, portrait printing, stapling, and high-quality printing indicated by the respective function icons K1, K2, K3, K5, and K6, causes the post-processor 18 to execute the stapling function for each sheet of recording paper, and creates the finished state of the printed material indicated by the finish icon F11 using the image forming device 12 and the post-processor 18 (S105). Thereafter, the process ends.

Even when the controller 31 detects a drag-and-drop operation with respect to an arbitrary function icon, the controller 31 does not perform the processes subsequent to S112 and returns to the process of S104 while continuing to highlight the original finish icon F1 in a case in which the arbitrary function icon has not been arranged near the highlighted finish icon by the drag-and-drop operation ("No" in S111).

Further, when the controller 31 determines that the combination of the function indicated by any one of the function icons already associated with the finish icon with the function indicated by the addition target function icon is not allowed ("No" in S112), the controller 31 highlights the function icon indicating the function of which a combination with the function indicated by the addition target function icon is not allowed on the setting screen G2 of the display device 21, and performs a warning with respect to this combination (S114).

In this case, when the user moves the addition target function icon to a position overlapping the function icon of which the combination is determined not to be allowed, through a drag-and-drop operation with respect to the addition target function icon, the controller 31 receives an instruction to cancel the association display of the function icon of which the combination is not allowed, through the touch panel 23 ("Yes" in S115). The controller 31 cancels the association display of function icons of which the combination is not allowed. The controller 31 further searches the data table DT for another finish icon associated in common with all the identifiers KID of the function icons other than the function icon of which the combination is not allowed, which are any of the function icons already associated with the finish icon, and the identifier KID of the addition target function icon, displays (highlights) the other finish icon associated in common, in place of the original finish icon on the setting screen G2 of the display device 21, arranges and causes the display device 21 to display the function icons other than the function icon of which the combination is not allowed, and the addition target function icon around the other finish icon, and display respective lines L connecting the other finish icon to the function icons other than the function icon of which the combination is not allowed and the addition target function icon (S116).

Figure 12A:
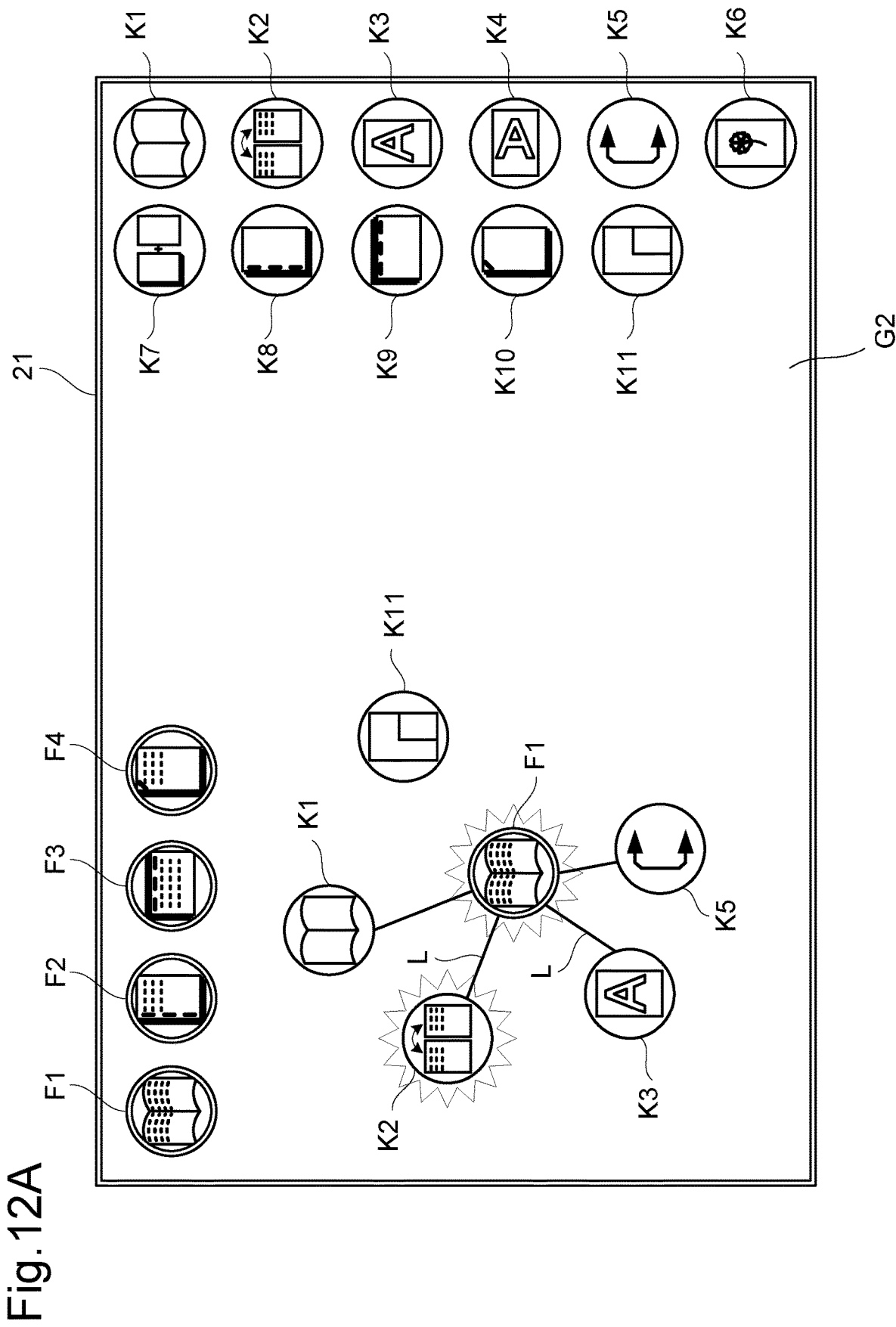
FIG. 12A is a diagram illustrating the setting screen of the display device on which the finish icon and the function icons have been displayed in association with each other.

For example, in a case in which an arbitrary function icon K11 has been arranged near the finish icon F1 in a state in which the finish icon F1 is associated with the respective function icons K1, K2, K3, and K5 as illustrated in FIG. 12A, and when a combination of the function indicated by the function icon K2 already associated with the finish icon F1 with a function indicated by the arbitrary function icon K11 is not allowed, the function icon K2 is highlighted and a warning with respect to this combination is performed. The highlighting of this function icon K2 is an example of "an image indicating that addition of another different function icon is not allowed" in the claims. In this state, when the arbitrary function icon K11 is moved to a position overlapping the function icon K2 of which the combination with the arbitrary function icon K11 has been determined not to be allowed through a drag-and-drop operation, the function icon K2 is hidden, the arbitrary function icon K11 is additionally displayed in place of the function icon K2, another finish icon F12 associated in common with all of the identifiers KID of the respective function icons K1, K3, K5, and K11 is read out from the data table DT, the other finish icon F12 is highlighted in place of the original finish icon F1 as illustrated in FIG. 12B, the respective function icons K1, K3, K5, and K11 are arranged and displayed around the other finish icon F12, and respective lines L connecting the other finish icon F12 to the respective function icons K1, K3, K5, and K11 are displayed. The respective function icons K1, K3, and K5 are as described above. Further, the function icon K11 indicates reduction printing, and a function of this reduction printing is executed by the controller 31 and the image forming device 12.

After S116, the process proceeds to S104. When the controller 31 receives an input of the copy operation execution instruction on the basis of the operation of the user with respect to the start key of the operation device 22 in S104 in a state in which the finish icon F11 is highlighted as described above ("Yes" in S104), the controller 31 causes the image reading device 11 to sequentially read images of a plurality of documents, causes the image forming device 12 to record the image of each document on one side of each sheet of recording paper according to the saddle stitching, portrait printing, stapling, and reduction printing indicated by the respective function icons K1, K3, K5, and K11, and causes the post-processor 18 to perform, for example, the stapling process for each sheet of recording paper to create the finished state of the printed material indicated by the finish icon F12 (S105). Thereafter, the process ends.

When the addition target function icon is not moved to the position overlapping the function icon of which the combination with the addition target function icon has been determined not to be allowed through the touch panel 23, and an instruction to cancel the function icon of which the combination has been determined not to be allowed has not been received ("No" in S115), the controller 31 returns to the process of S104 without performing the process of S116.

As described above, in the embodiment, the function icon indicating the function of setting the finished state of the printed material indicated by the finish icon is displayed in association with the finish icon on the setting screen G2 of the display device 21 in a state in which the finish icon has been displayed on the setting screen G2 of the display device 21, and the finish icon indicating the finished state of the printed material is changed according to deletion, addition, or change of the function icon. Accordingly, the function icons indicating functions necessary for setting the finished state of the printed material indicated by the finish icon are sequentially changed and displayed, such that the user can easily set the finished state of the printed material by visually recognizing such a display even when the user has little prior knowledge about settings of the printed material.

In the general image forming apparatus described in BACKGROUND, although the user releases or adds the copy condition while viewing the preview image of the copy, it may be difficult for the user to determine which function should be used in order to select copy conditions in order to achieve a desired finished state of printed material, and the preview image of the copy may be quite different from the expectations of the user.

On the other hand, in the embodiment, it is possible to support the user so that the user can easily select functions necessary for setting the finished state of the printed material. Specifically, since the finish icons indicating the finished state of the printed material and the function icons indicating the function of setting the finished state of the printed material are displayed, it is possible to support the user so that the user can easily select functions necessary for setting the finished state of the printed material to a desired state even when the user has little prior knowledge about print settings.

Further, the configuration and processes of the embodiment described with reference to FIGS. 1 to 12B are merely an embodiment of the present disclosure, and are not intended to limit the present disclosure to this configuration and these processes.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
a display device;
a storage device configured to store a plurality of finish icons each indicating a different finished state of a printed material, a plurality of function icons each indicating a different setting content of each of printing functions, and, for each of the finish icons, a correspondence relationship between a finish icon and one or more function icons corresponding to one or more setting contents required to realize a finished state indicated by the finish icon,
a control device including a processor and functioning as a controller configured to:
cause the display device to display, on a screen thereof, the plurality of finish icons and the plurality of function icons,
read out, when the controller receives an instruction to select any one of the plurality of finish icons, a selected finish icon from the storage device, cause the display device to display, on a free space of the screen, the selected finish icon, read out one or more function icons associated with the selected finish icon from the storage device on a basis of the correspondence relationship stored in the storage device, and cause the display device to display, on the free space of the screen, the one or more function icons around the selected finish icon, by the processor executing a control program,
wherein the controller causes the display device to display an association between the selected finish icon and the one or more function icons using one or more line images connecting the selected finish icon to each of the one or more function icons.

2. The image forming apparatus according to claim 1, wherein the controller causes the display device to display, on the screen thereof, the plurality of finish icons and the plurality of function icons in different display forms.

3. The image forming apparatus according to claim 1, further comprising:

an operation device operated by a user, wherein, when any one of the one or more function icons is designated through an operation with respect to the operation device in a state in which the one or more function icons are displayed in association with the selected finish icon on the display device, the controller reads out another finish icon associated with the designated function icon from the storage device on the basis of the correspondence relationship stored in the storage device, and further causes the display device to display, on the free space of the screen, the other finish icon in association with the designated function icon.

4. The image forming apparatus according to claim 1, further comprising:

an operation device into which an instruction from a user is input, wherein, when an instruction to hide any one of plurality of function icons is input through an operation with respect to the operation device in a state in which the plurality of function icons are displayed in association with the selected finish icon on the display device, the controller reads out another finish icon associated with the other function icons other than the function icon instructed to be hidden among the plurality of function icons from the storage device on the basis of the correspondence relationship stored in the storage device, and causes the display device to display, on the free space of the screen, the other finish icon in association with the other function icons.

5. The image forming apparatus according to claim 1, further comprising:

an operation device into which an instruction from a user is input, wherein, when addition of another function icon different from the one or more function icons is instructed through an operation with respect to the operation device in a state in which the one or more function icons are displayed in association with the selected finish icon on the display device, the controller causes the display device to display the different other function icon in association with the selected finish icon in a case in which the controller has determined that the addition of the different other function icon to the one or more function icons already displayed at this time is allowed.

6. The image forming apparatus according to claim 5, wherein, when the addition of another function icon different from the one or more function icons is instructed through an operation with respect to the operation device, the controller causes the display device to display an image indicating that the addition of the different other function icon is not allowed in a case in which the controller has determined that the addition of the different other function icon to the one or more function icons already displayed at this time is not allowed on the basis of the correspondence relationship stored in the storage device.

7. The image forming apparatus according to claim 1, wherein, when the controller receives a print execution instruction through an operation with respect to the operation device in a state in which the one or more function icons are displayed in association with the selected finish icon on the display device, the controller performs control for setting the finished state based on one or more setting contents indicated by the one or more function icons displayed in association with the selected finish icon as the finished state of image formation and creating printed material in the set finished state of image formation.

8. The image forming apparatus according to claim 2, further comprising:

an operation device into which an instruction from a user is input, wherein, when a slide operation of crossing a line image connecting the selected finish icon to any one of plurality of function icons is detected through the operation device in a state in which the plurality of function icons are displayed in association with the selected finish icon on the display device, the controller cancels the association display using the line image, reads out another finish icon associated with the other function icons other than the function icon canceled the association display using the line image among the plurality of function icons from the storage device on the basis of the correspondence relationship stored in the storage device, and causes the display device to display, on the free space of the screen, the other finish icon in association with the other function icons.

* * * * *